Aug. 5, 1958    A. H. IVERSEN    2,846,655
IMPREGNATED FERRITE
Filed Aug. 19, 1955
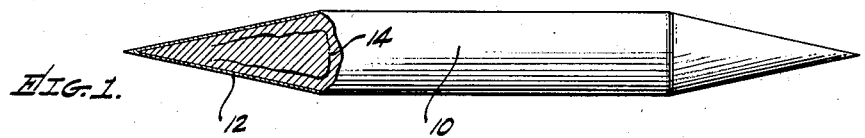
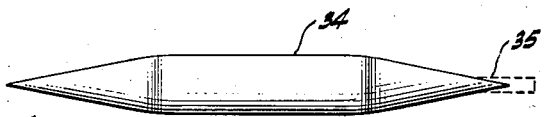
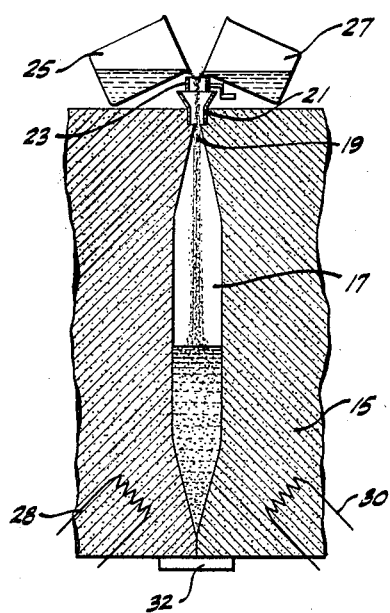
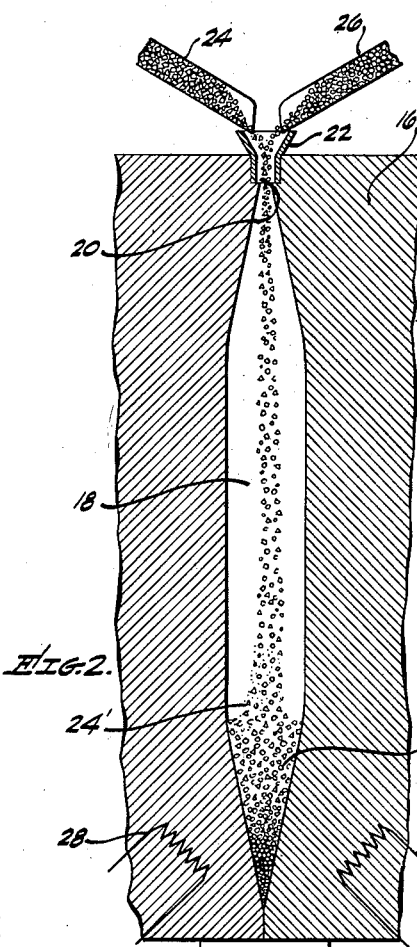
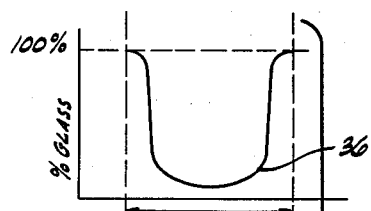
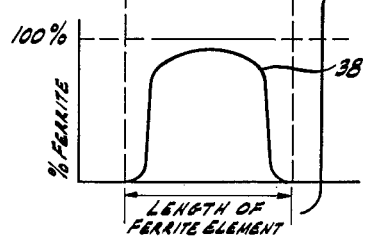
INVENTOR.
ARTHUR H. IVERSEN,
BY
Henry Heyman
ATTORNEY.

United States Patent Office 2,846,655
Patented Aug. 5, 1958

2,846,655

IMPREGNATED FERRITE

Arthur H. Iversen, Santa Monica, Calif., assignor to Hughes Aircraft Company, Culver City, Calif., a corporation of Delaware Application August 19, 1955, Serial No. 529,512

3 Claims. (Cl. 333—34)

This invention relates generally to ferrites for use in microwave applications, and more particularly to an impregnated ferrite body and its manufacture.

A typical ferrite dielectric element for use in microwave devices has the shape of a rod tapered to a point on both ends. Ordinarily, the rod is formed by extrusion, cut to length, and then ground to have pointed ends for impedance matching purposes. The extrusion process is an expensive one requiring elaborate equipment, and due to fabrication difficulties, produces stress lines within the extruded rod. As a result, under operating conditions of high temperature or high applied microwave power, the extruded rod frequently cracks and crumbles. Also, the extruded ferrite body is inherently porous because ferrites are non-vitrified ceramics. Accordingly, when a ferrite is heated, it decomposes before it melts or vitrifies. Its porous characteristic makes a finished ferrite element susceptible to moisture-caused destruction under the usual operating conditions.

This has been overcome in the past by the extra step of coating the finished ferrite element with a vitreous material such as glass. Such a coating had the advantages of hermetically sealing the surface of the ferrite body, while at the same time improving the impedance match between the ferrite and space, or vacuum, since the glass has a dielectric constant approximately midway between that of ferrite and that of air or vacuum. This second step of vitreously coating the ferrite element required further equipment and added to the expense of making the dielectric element.

It is an object of the present invention to provide an improved ferrite element.

It is a further object to provide a method of manufacture of such an element which does not require extruding equipment.

It is another object to provide a method of manufacture which does not require coating of the ferrite element with glass.

It is still another object to provide a glass-impregnated ferrite element having a predetermined ferrite-glass distribution throughout its structure.

Briefly, in accordance with the present invention, these objects are achieved in the following manner:

Ferrite powders and a matching glass in powder form both suspended in suitable media are introduced and mixed in a predetermined proportion in a mold of predetermined elongated shape and dimension and then thermally fused after removing the suspending media, thereby providing a glass-impregnated ferrite body having the shape of the mold. Instead of glass any suitable glass-like or vitreous substance such as quartz powder may be used for manufacturing the ferrite body of the invention. In one particular embodiment, the proportion of glass is varied from being substantially all glass at the end portions of the ferrite body to being predominantly all ferrite in the mid-portions, between the end portions. Sufficient glass is, however, included throughout the ferrite element to bind and hermetically seal the element.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only, and is not intended as a definition of the limits of the invention.

In the drawing:

Fig. 1 is a partially sectioned view of a typical, conventional ferrite element;

Fig. 2 is a sectional view of a structure illustrating one step of the process of the invention;

Fig. 3 is a partially sectioned view showing one step of an alternative method of the invention;

Fig. 4 is a view of a finished ferrite element in accordance with the present invention; and Fig. 5 is a pair of graphs to aid in the description of the invention.

Referring now to the drawing, and more particularly to Fig. 1, there is shown a length of extruded ferrite rod 10, the ends of which have been ground to a predetermined taper for impedance matching purposes. A layer of glass 12 is shown covering the finished ferrite body in a manner to hermetically seal the porous ferrite and to further aid in impedance matching. Potential fissure areas or surfaces 14, as previously pointed out, are caused by the rod extension process and may seriously weaken the ferrite element against thermal strains when in use. Further, the shape of the ferrite element is limited by certain grinding processes in view of the fragility of the ferrite rod.

Referring to Fig. 2, there is shown an example of apparatus used in the process in accordance with the present invention. Carbon mold 16 is provided with an inner recess 18. Obviously recess 18 may be any desired shape. Neck portion 20 is a channel connecting recess 18 to a feeding nozzle 22. A pair of conduits 24 and 26 convey, respectively, the suspension of ferrite powders and of glass powders to nozzle 22. Instead of a glass powder, quartz powder or any other vitreous or glass-like powder may be used. Heating elements shown substantially at 28 and 30 heat the mold in such a manner that the glass and ferrite will be fused. A supersonic vibrator indicated substantially at 32 is shown in acoustical connection with mold 16 for tamping or packing more densely the ferrite and the glass in recess 18. Circular grains 24' represent the powdered glass granules and triangular grains 26' represent the ferrite powder granules.

Referring to Fig. 3, there is shown an alternative example of apparatus suitable in the process of the invention. Plaster casting mold 15 is formed to provide a recess 17 which may be of any desired predetermined shape and size corresponding to that of the ferrite element. Feeding nozzle 21 is connected to recess 17 through a neck portion 19. Beakers 25 and 27 contain, respectively, a ferrite casting slip and a glass powder suspension and are shown as examples of means for introducing and programming the introduction of these materials into recess 17. Beakers 25 and 27 pour into a mixer 23 which stirs the two slurries into one homogeneous slip, then pours the one combined slip into nozzle 21 and thence into neck portion 19 and finally into recess 17 where the casting slip may be settled by ultrasonic vibrator 32 and dried by plaster cast 15 which absorbs the liquid of the slurry. When the cast slip has been dried, the ferrite element is heated by heating elements 28 and 30 to fuse the ferrite and glass.

The manner of preparation of suitable slips is well known in the ceramic art; a general discussion of techniques and theories of casting slips is given in Elements of Ceramics (Addison-Wesley Press, Cambridge, Mass., 1952), by F. H. Norton, chapter 10.

Fig. 4 illustrates a finished ferrite element 34; neck portion 35 shown in dotted lines may be removed.

Referring to Fig. 5, graph 36 plots the percentage of glass in the composition of the ferrite element as a function of position along the length of the ferrite element. Graph 38 in like manner shows the percentage composition of ferrite as the function of position along the length of the ferrite element.

In practicing the process of the present invention, as illustrated by Fig. 2, ferrite and glass powder, as represented by grains 24' and glass grains 26', is fed in liquid suspension through conduits 24 and 26, respectively, by appropriate pressure or gravity feed through nozzle 22, into mold 16, and via neck portion 20 into recess 18. The flow of the powders may be programmed in such a manner that, as shown by curves 36 and 38, the ends of the finished element may be substantially of glass while the intermediate portion is substantially of ferrite with, however, enough glass impregnated in the ferrite to hermetically seal and bond the ferrite. Impedance mismatch for microwaves propagated from air or vacuum into and along the length of the ferrite element is in this manner substantially eliminated because the end portion is not only tapered, but is composed of glass having a dielectric constant approximately half-way intermediate that of air and ferrite. Further, the dielectric constant is only gradually increased to that of ferrite because of the smooth transition of the glass to ferrite proportion along the length of the ferrite element. Vibrator 32 operates to pack more densely the powders or slurry by ultrasonic vibration of form 16. When the introduction of the powders or slurry is completed, heating elements 28 and 30 may be energized to fuse the glass and ferrite into one ferrite element. Then the heaters are deenergized; form 16 cooled and opened; and ferrite element 34 removed. Neck portion 35 may then be removed, and the element is ready for use.

In like manner, the method of the invention, as illustrated in Fig. 3 including the programming and introduction of ferrite and glass into casting recess 17 in plaster cast 15, such that the composition of the finished ferrite element is that shown by the graphs of Fig. 5.

There has thus been disclosed a process for manufacturing a glass-impregnated ferrite element having an arbitrary percentage composition of glass and ferrite along its length which is impervious to moisture, is hermetically sealed, and has an improved impedance match between the ferrite dielectric and space. Further, there has been disclosed a process which requires neither the use of extruding equipment nor the added step of glass coating a fragile extruded ferrite element.

What is claimed is:

1. A microwave ferrite element impregnated with a vitreous material and having a predetermined proportional composition of ferrite versus vitreous material along a predetermined direction, said composition being substantially all vitreous material at a first portion near the ends of said element along said predetermined direction and predominantly ferrite at a second portion between said ends and having a continuous transition between said portions for improved impedance match between said ferrite and space and having sufficient impregnation of said vitreous material such that said element is bonded and hermetically sealed at its surface by said vitreous material.

2. An elongated microwave ferrite element impregnated with a vitreous material and suitable for use in microwave applications, said element consisting substantially of ferrite and glass thermally fused, said element having along its length a predetermined proportional composition of ferrite versus glass, said composition being substantially all glass at the ends of said element and having less glass and more ferrite in smoothly varying proportions toward the midpoint of said element for improved impedance match between said ferrite and space, the proportion of glass throughout said element being sufficient to hermetically seal and bond said element by said glass.

3. An elongated fused glass-impregnated microwave ferrite element having pointed ends and a substantially cylindrical center portion, said element having a predetermined proportional composition of ferrite versus glass along its length, said composition being substantially all glass in said pointed ends and predominantly ferrite throughout said cylindrical center portion and having a smooth transition in said proportional composition between said pointed ends and said center portion for improved impedance match between said ferrite and space and having sufficient glass throughout said center portion to hermetically seal and bond said ferrite element.

References Cited in the file of this patent

UNITED STATES PATENTS

| | | |
|---|---|---|
| 1,506,060 | Henker | Aug. 26, 1924 |
| 2,101,540 | Cullich | Dec. 7, 1937 |
| 2,565,111 | Schoenberg | Aug. 21, 1951 |
| 2,568,881 | Schoenberg | Sept. 25, 1951 |
| 2,644,930 | Luhrs | July 7, 1953 |
| 2,671,884 | Zaleski | Mar. 9, 1954 |
| 2,719,274 | Luhrs | Sept. 27, 1955 |
| 2,748,353 | Hogan | May 29, 1956 |

UNITED STATES PATENT OFFICE
CERTIFICATE OF CORRECTION

Patent No. 2,846,655 August 5, 1958

Arthur H. Iversen

It is hereby certified that error appears in the printed specification of the above numbered patent requiring correction and that the said Letters Patent should read as corrected below.

Column 2, line 30, for "extension" read --extrusion--.

Signed and sealed this 14th day of October 1958.

(SEAL)
Attest:

KARL H. AXLINE
Attesting Officer

ROBERT C. WATSON
Commissioner of Patents